Jan. 8, 1924. 1,479,889
J. B. BROWN
SPARROW TRAP
Filed Nov. 17, 1919 2 Sheets-Sheet 1

Inventor
John Bee Brown
By B. Singer
Attorney

Jan. 8, 1924. 1,479,889
J. B. BROWN
SPARROW TRAP
Filed Nov. 17, 1919 2 Sheets-Sheet 2

Inventor
John Bee Brown
By B. Singer
Attorney

Patented Jan. 8, 1924.

1,479,889

UNITED STATES PATENT OFFICE.

JOHN B. BROWN, OF WAKANUI, ASHBURTON, NEW ZEALAND.

SPARROW TRAP.

Application filed November 17, 1919. Serial No. 338,483.

*To all whom it may concern:*

Be it known that I, JOHN BEE BROWN, subject of the King of Great Britain, residing at Wakanui, Ashburton, in the Dominion of New Zealand, have invented a new and useful Improved Sparrow Trap (for which I filed an application in New Zealand November 11, 1918, No. 40,942, patented October 2, 1919; Great Britain, No. 158,442, filed November 21, 1919, dated under Convention of November 11, 1918; Canada, No. 199,481, filed November 22, 1919, patented April 27, 1920); and I do hereby declare the following to be a full, clear, and exact description of the same.

This invention has been devised in order to provide an improved construction of sparrow trap, the principal feature of which construction provides for the unimpeded ingress of the birds through an opening into a bait chamber and for this opening being then obscured from the birds' vision from the inside, while the trap openings from the bait chamber into an adjacent trap chamber proper are in plain view so that the birds will pass into such second chamber and be finally trapped. The construction also is such that the efforts of the birds to escape from the bait chamber will lead them into the trap openings into the second chamber.

The invention consists in constructing the trap of the ordinary wire mesh or netting and with two chambers, a bait chamber and a bird enclosure, with an inlet passage or passages between them, and in constructing the bait chamber with an end or wall curving concavely on its inside and in which curve an unimpeded inlet is formed, or if desired more than one of such inlets. If desired also, each inlet may have a screen of similar material to the trap arranged to extend across its front at a suitable distance away to permit of the free passage of the birds into the inlet opening.

The invention may be carried out in a number of ways, the general features of the invention being embodied therein. In the accompanying drawings different constructions of the trap are shewn, the drawings being to a large extent diagrammatic.

In such drawings:—

Figure 3:
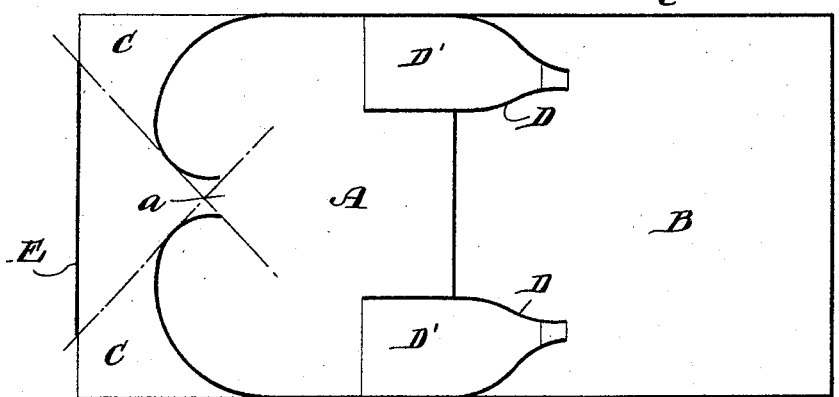

Figure 3 a plan thereof.

Figures 4 to 11 are a number of diagrammatic plans illustrative of different ways of arranging the inlets into the bait chamber and the passages from the bait chamber into the enclosure or second chamber.

Figure 1:
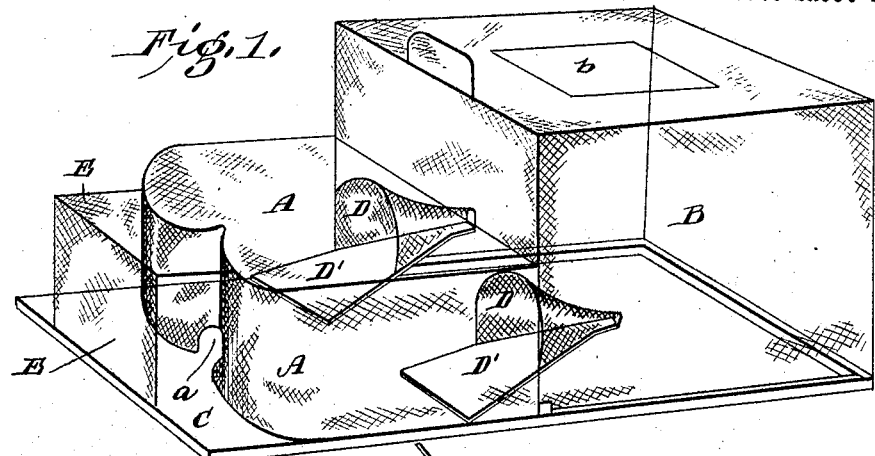
Figure 1 is a perspective elevation of a complete trap.
Figure 2:
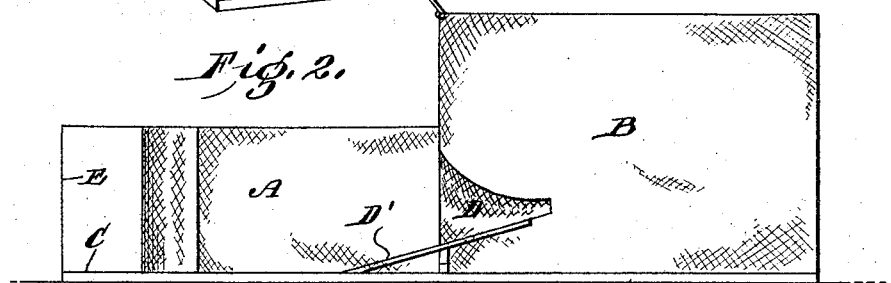
Figure 2 is a side elevation.

Referring more particularly to the construction shewn in Figures 1 to 3 and generally to the whole of the drawings A represents the entry or bait chamber, and B the second chamber or enclosure in which the trapped birds are kept the said chamber having a door or cover *b*. These are made of any desired relative sizes and are erected on a wire framing supported by a base board C and with their walls and tops made of any approved wire mesh or netting of a suitable size mesh to suit the class of birds for which the trap is to be used. Connecting the two chambers A and B are one or more funnel shaped openings or passages D tapering inwards into the chamber B and each having a bottom formed by the inclined plate D'. These openings are disposed so that their smaller ends are elevated above the floor of the enclosure a sufficient height. These smaller ends also are made of such a size as just to permit of a bird passing freely through them so that a bird passing from the chamber A into the chamber B, in its efforts to escape from the chamber B, will quite overlook these openings. Usually the bird will encircle the outer walls and when passing across the divisional wall between the two chambers will pass either above or below the funnel shaped passages D.

The outer end wall of the chamber A is made with a shape curving from both side walls, concavely towards the centre line thereof, as viewed from the inside, and in the middle, at the bottom, such end wall is made with an inlet opening *a* of sufficient size to permit of the free passage of the birds into this chamber from the outside. The base board C is preferably made to extend beyond this front end of the trap to form an alighting platform for the birds attracted by the bait within the chamber A so that they may alight and pass in through the opening *a* the concave outer shape of the end leading naturally into the said opening. The inner concave shape of the end wall in conjunction with positioning the passages D into the chamber B at the sides and practically continuous with the walls of the chamber A, as shewn in the several constructions illustrated in the drawings, will ensure that upon a bird entering the chamber A, it will in its efforts to escape fly round the walls and be directed by the curves thereof into one of such passages D and thus be led to pass through it into the enclosure B. The relatively small entry opening $a$, in conjunction with its position between the curves on each side will escape the bird's attention in most cases.

In order however that the said entry $a$ may be still further obscured or confused from the vision of a bird within the chamber A, a wire work screen E, preferably of smaller mesh than that of which the trap is made, is fixed to extend across the front of the opening $a$ at a distance away therefrom sufficiently great to leave the entry quite unimpeded. This screen is carried up to a suitable height and if desired may also be extended inward above the opening to join the chamber, as shewn in Figure 1. It is advisable that this screen should be of sufficient length such that when viewed from all angles through the opening $a$ from the inside, the screen will be visually across the opening, as indicated by the diagonal lines in Figure 3 by which the maximum angles of vision are shewn. The provision of this screen will give an impression of continuity to the walls to the birds within the chamber A so that the possibility of the presence of the opening being detected by them is very remote.

Figure 4:
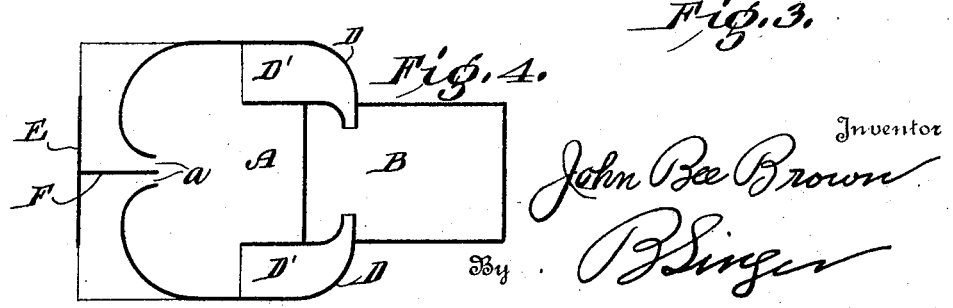
Figure 5:
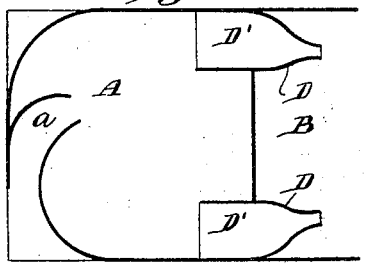

In the variation shewn in Figure 4 the entry $a$ is divided into two by a division F extending out from it to the screen E and the passages D are shaped to curve inwards into the chamber B so that more advantage is obtained from the tendency of the birds to fly round the walls of the chamber A in their efforts to escape from the said chamber.

Figure 6:
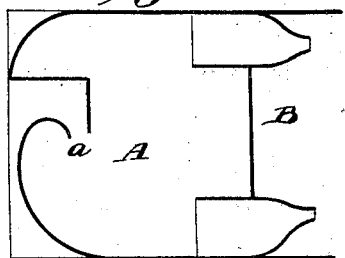
Figure 7:
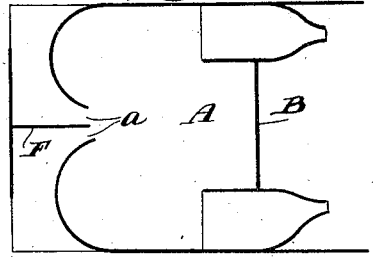
Figure 8:
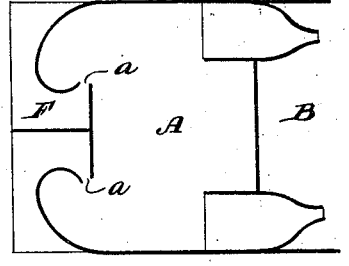
Figure 9:
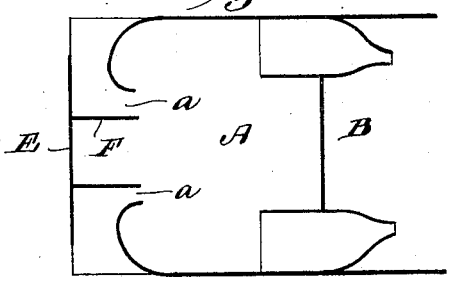
Figure 10:
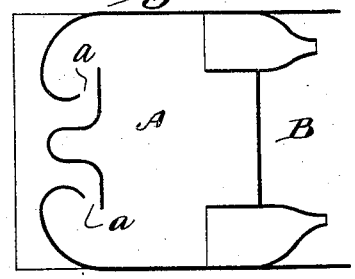

In the variations shown in Figures 5 to 10 several different forms of entry are shewn, each one being positioned in curving walls and end, and each being shewn screened from the inside by wire mesh which in some instances, as for instance in the forms shewn in Figures 6, 8 and 10, may be effected by the formation of the entry itself.

Figure 11:
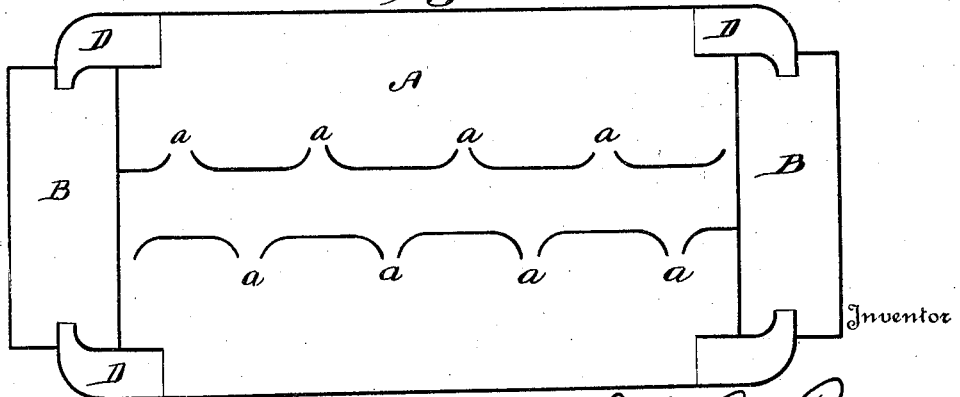

In Figure 11 a double trap is shewn, having two bait chambers A oppositely disposed upon the platform C and chambers B across both ends into which the two ends of the respective bait chambers open through passages D. In this construction the adjacent walls of the two bait chambers are made with a number of concave curves in their length and with openings $a$ between each curve. The openings of the two chambers are staggered with one another so that each opening is opposite a portion of the wall of the other chamber and is therefore "screened" by such wall.

Traps made upon these lines may be formed of any desired size and for any classes of birds.

I claim:—

A sparrow trap formed by a bait chamber combined with a bird enclosure and having an inlet passage or passages leading from the bait chamber to the enclosure, a curved wall of such bait chamber having a concave inner surface, an inlet opening or openings in such curved wall and a screen arranged to extend across the outside of such opening or openings and disposed at a suitable distance therefrom, substantially as specified.

In testimony whereof, I have signed this specification in the presence of two subscribing witnesses.

JOHN B. BROWN.

Witnesses:
E. GUNRO,
J. ROBSON.